(12) United States Patent
 Eriksson et al.

(10) Patent No.: US 11,054,065 B2
(45) Date of Patent: Jul. 6, 2021

(54) METHOD FOR MANUFACTURING A COMPOSITE TUBE

(71) Applicant: SANDVIK INTELLECTUAL PROPERTY AB, Sandviken (SE)

(72) Inventors: Olle Eriksson, Sandviken (SE); Henrik Häll, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 30 days.

(21) Appl. No.: 16/472,461

(22) PCT Filed: Dec. 22, 2017

(86) PCT No.: PCT/EP2017/084515
§ 371 (c)(1),
(2) Date: Jun. 21, 2019

(87) PCT Pub. No.: WO2018/115502
PCT Pub. Date: Jun. 28, 2018

(65) Prior Publication Data
US 2020/0408336 A1 Dec. 31, 2020

(30) Foreign Application Priority Data

Dec. 23, 2016 (EP) .................... 16206889

(51) Int. Cl.
*F16L 9/14* (2006.01)
*B21D 39/04* (2006.01)
*F16L 58/00* (2006.01)

(52) U.S. Cl.
CPC .............. *F16L 9/14* (2013.01); *B21D 39/048* (2013.01); *F16L 58/00* (2013.01); *Y10T 29/302* (2015.01);

(Continued)

(58) Field of Classification Search
CPC ............. Y10T 29/302; Y10T 29/49826; Y10T 29/49881; Y10T 29/49838; Y10T 29/5185; F16L 9/14; F16L 58/00; B21D 39/048

(Continued)

(56) References Cited

U.S. PATENT DOCUMENTS 4,629,225 A * 12/1986 Rowsey ................. F16L 15/001
285/333
4,795,078 A 1/1989 Kuroki et al.
(Continued)

FOREIGN PATENT DOCUMENTS

CN   100419253 C   9/2018
DE     947063 C   8/1956
(Continued)

OTHER PUBLICATIONS

Korean Office Action dated Oct. 21, 2019, issued in corresponding Korean Patent Application No. 10-2019-7017872.
(Continued)

*Primary Examiner* — Sarang Afzali
*Assistant Examiner* — Darrell C Ford
(74) *Attorney, Agent, or Firm* — Morgan, Lewis & Bockius LLP

(57) ABSTRACT

Method for manufacturing a composite tube having at least one double-layered portion with an annular outer layer of a first alloy and an annular inner layer of a second alloy provides a base component of the second alloy, having a central through-hole and an externally threaded section, provides an outer component of the first alloy, having an internally threaded section configured to engage with the externally threaded section, forms a tubular work piece by mounting the outer component around the base component such that the internally threaded section is in engagement (Continued)

with the externally threaded section, and hot works the work piece so that a metallic bond is formed between the threaded sections while the mechanical interlock is maintained, and so that the work piece is elongated and its outer diameter is reduced, thus forming a composite tube.

17 Claims, 4 Drawing Sheets

(52) U.S. Cl.
CPC .... *Y10T 29/49826* (2015.01); *Y10T 29/49838* (2015.01); *Y10T 29/49881* (2015.01); *Y10T 29/5185* (2015.01)

(58) Field of Classification Search
USPC .................. 29/17.3, 428, 456, 33 D, 433
See application file for complete search history.

(56) References Cited

U.S. PATENT DOCUMENTS

| | | | | |
|---|---|---|---|---|
| 5,324,595 | A * | 6/1994 | Rosen | B32B 15/013 |
| | | | | 138/143 |
| 6,604,761 | B1 * | 8/2003 | Debalme | F16L 47/16 |
| | | | | 285/353 |
| 2005/0058851 | A1 * | 3/2005 | Smith | B23K 9/0026 |
| | | | | 428/685 |
| 2007/0175014 | A1 * | 8/2007 | Van Nguyen | A63B 59/51 |
| | | | | 29/428 |
| 2010/0301603 | A1 * | 12/2010 | Beigneux | F16L 15/004 |
| | | | | 285/390 |
| 2011/0120688 | A1 * | 5/2011 | Kadah | B21D 39/046 |
| | | | | 165/182 |
| 2014/0037979 | A1 * | 2/2014 | Cacace | B21D 39/04 |
| | | | | 428/577 |
| 2014/0151130 | A1 * | 6/2014 | Partouche | E21B 17/003 |
| | | | | 175/320 |
| 2014/0326090 | A1 * | 11/2014 | Kisa | B21D 53/10 |
| | | | | 74/89.23 |
| 2015/0210888 | A1 * | 7/2015 | Goto | F16L 15/04 |
| | | | | 285/70 |
| 2016/0116080 | A1 * | 4/2016 | Bouey | F16L 15/006 |
| | | | | 156/272.2 |

FOREIGN PATENT DOCUMENTS

| | | |
|---|---|---|
| DE | 1295333 B | 5/1969 |
| DE | 3314264 A1 | 10/1984 |
| GB | 897635 A | 5/1962 |
| JP | S56-077041 A | 6/1981 |
| JP | S59-218215 A | 12/1984 |
| JP | H08-25063 A | 1/1996 |
| JP | H08-174051 A | 7/1996 |
| RU | 2301732 C1 | 6/2007 |

OTHER PUBLICATIONS

Chinese Office Action dated Jun. 30, 2020, issued in corresponding Chinese Patent Application No. 201780079189.X.
International Search Report and Written Opinion dated Apr. 5, 2018, issued in corresponding International Patent Application No. PCT/EP2017/084515.

* cited by examiner

METHOD FOR MANUFACTURING A COMPOSITE TUBE

TECHNICAL FIELD

The present disclosure relates to a method for manufacturing a composite tube and to a composite tube, which comprises at least one multi-layered portion with an annular outer layer of a first alloy and an annular inner layer of a second alloy.

BACKGROUND AND PRIOR ART

When manufacturing a composite tube having at least one annular outer layer of a first alloy and an annular inner layer of a second alloy, there is a problem with oxidation during the manufacturing process as oxygen may enter between the annular inner and outer layers and thereby prevent metal bonding and also increase the risk of separation of the two annular layers during hot working. One way to solve this problem is to weld the annular inner and outer layers together at the ends thereof before hot working.

However, there are cases in which the above described technique is not suitable, for example for the manufacturing of composite tubes in which at least one of the inner and outer layers comprises an alloy which is difficult to weld, such as for example iron chromium aluminium (FeCrAl) alloys and other high temperature materials.

SUMMARY

In view of the above mentioned problems, it is desirable to provide an alternative method for manufacturing a composite tube.

According to a first aspect of the present disclosure, this is achieved by means of a method for manufacturing a composite tube comprising the steps of:
- providing an annular base component of a second alloy, wherein the annular base component has a central through-hole extending along a longitudinal axis of the annular base component, and wherein the annular base component has an externally threaded section,
- providing an annular outer component of a first alloy, wherein the annular outer component has an internally threaded section configured to engage with the externally threaded section of the annular base component,
- forming a tubular work piece by mounting the annular outer component around the annular base component such that the internally threaded section of the annular outer component is in engagement with the externally threaded section of the annular base component, forming a mechanical interlock between the threaded sections,
- hot working the tubular work piece, so that on one hand a metallic bond is formed between the threaded sections of the outer component and the base component while the mechanical interlock is maintained, and so that on the other hand the work piece is elongated and an outer diameter of the tubular work piece is reduced, thus forming a composite tube.

By mechanically interlocking the base component and the outer component by means of threaded engagement prior to hot working, a mechanical seal is formed. Additionally, the threading will create a large contact area between the surfaces of the annular base component and annular component, as the contact area will become greater thereby the area where the metallic bonds will be formed will also increase. Thus, the conditions for forming a metallic bond will be improved. It has furthermore been found that the mechanical seal provided by the threading is sufficient for preventing oxygen from entering between the annular base component and the annular outer component. The helical threading also efficiently prevents the components from both separating and sliding during hot working.

The annular base and outer components may be configured so that, when the annular outer component has been threaded onto the annular base component, further axial movement of the outer component with respect to the base component is prevented. For this purpose, a stopping means can be provided at an end of the externally threaded section of the base component, preventing a leading end of the outer component during threading to be advanced further. Such a stopping means can for example be a section with a larger outer diameter than the outer diameter at the externally threaded section, or an externally projecting stopping member. An alternative is to provide a stopping means at a trailing end of the internally threaded section, preventing the trailing end from advancing further onto the base component in the axial direction. Such a stopping means can be in the form of a section with a smaller inner diameter than the inner diameter at the internally threaded section, or an internally projecting stopping member.

According to the proposed method, a metallic bond is formed between the annular base and outer components during hot working while the mechanical interlock is maintained. The mechanical interlock, which can be seen as a helix formed in an interface between the annular inner and outer layers of the resulting composite tube, increases the area of the interface and may thereby contribute to an improved distribution of forces applied to the composite tube in comparison with a composite tube without such a helix. Thus, composite tubes manufactured according to the proposed method may be able to withstand higher load in the interface.

The metallic bond is formed by means of hot working, such as hot extrusion, hot drawing, hot rolling or hot piercing, or other suitable techniques.

The axial extension of the threaded sections as well as of the annular base component and the annular outer component may vary, and the annular base component may e.g. have a larger axial extension (length) than the annular outer component. The threaded sections of the annular base component and the annular outer component respectively may extend along all or part of each component as will be further described below.

According to one embodiment, the externally threaded section has an axial extension corresponding to an axial extension of the internally threaded section. When the threaded sections have equal lengths, the risk that oxygen enters between the components is reduced or even eliminated and the conditions are well-suited for forming a metallic bond between the inner and outer layers of the composite tube. The annular outer and base components may in this embodiment have equal or non-equal lengths in the axial direction.

According to one embodiment, the externally threaded section corresponds to an end portion of the annular base component. Hence, the end portion of the annular base component will be mechanically locked to the annular outer component.

According to one embodiment, the externally threaded section has a smaller outer diameter than an adjacent non-threaded section of the annular base component. In this embodiment, a tube which has a double-layered portion and a mono-layered portion can be formed, since the annular outer component can be of shorter length than the annular base component, corresponding to the length of the externally threaded section. The non-threaded section of the annular base component may in this case have an outer diameter corresponding to the outer diameter of the annular outer component.

According to one embodiment, the externally threaded section extends along an entire axial length of the annular base component. The annular base component is thereby well-suited for forming a multi-layered composite tube with all layers extending along an entire axial length of the tube. Alternatively, several shorter annular base components can be mounted around the annular base component to form a composite tube having an outer layer comprising two or more axially adjacent portions of different alloys.

According to one embodiment, the internally threaded section extends along an entire axial length of the annular outer component. The annular outer component can be mounted around one annular base component or around several shorter annular base components.

According to one embodiment, the step of hot working comprises hot extrusion by pushing the tubular work piece through an extrusion die with a leading end first. Hot extrusion is suitable for forming a metallic bond between the base component and outer component while efficiently reducing the outer diameter of the work piece.

According to one embodiment, the leading end is an end portion at which the outer component is mounted around the base component. For a tubular work piece having the annular outer component mounted at only one end of the annular base component, this configuration facilitates an estimation of the final length of the double-layered portion of the composite tube.

An alternative is to let the leading end be an end section at which no annular outer component is provided, i.e. extrude the work piece such that the end section at which the annular outer component is mounted around the base component is pushed through the extrusion die as the last part of the work piece. The annular outer component is in this case provided at a trailing end of the work piece.

According to one embodiment, the method further comprises machining the leading end prior to extrusion, such that a rounded leading end is formed. This facilitates pushing the leading end of the tubular work piece through the extrusion die. The machining may be cutting machining such as milling or turning, which removes material from the leading end.

According to one embodiment, the method further comprises the step of straightening the composite tube after hot extrusion.

According to one embodiment, the method further comprises the step of pickling and/or blasting the composite tube after hot extrusion. Pickling and/or blasting is used to remove unwanted material e.g. lubricants remaining from the hot working process.

According to one embodiment, the method further comprises the step of pre-heating the tubular work piece prior to the step of hot working the tubular work piece. Pre-heating may for some combinations of alloys be advantageous for forming a metallic bond in the hot working process.

According to one embodiment, the first alloy is selected from a stainless steel alloy, a nickel-based alloy, an iron chromium aluminium alloy, a carbon steel alloy, a zirconium alloy, an aluminium alloy, a copper alloy, or a titanium alloy.

According to one embodiment, the second alloy has a different composition than the first alloy and is selected from a stainless steel alloy, a nickel-based alloy, an iron chromium aluminium alloy, a carbon steel alloy, a zirconium alloy, an aluminium alloy, a copper alloy, or a titanium alloy. The method is advantageously used for alloys that are difficult to join by means of welding. The second alloy and the first alloy may both be for example stainless steel alloys having different elemental compositions or different content of alloying elements.

According to another aspect, the present disclosure relates to a composite tube formed using the proposed method of manufacturing. Such a composite tube can have inner and outer layers of alloys that would normally be difficult to join, due to the fact that the composite tube can be manufactured without welding. The mechanical interlock forms a helix in an interface between the inner and outer layers of the composite tube and increases the area of the interface between the two layers. It thereby contributes to an improved distribution of forces to which the composite tube is exposed in comparison with a composite tube without such a helix. Thus, the proposed composite tubes may be able to withstand higher load in the interface.

According to one embodiment, the composite tube has a mono-layered portion of said second alloy, and a multi-layered portion having an annular outer layer of said first alloy and an annular inner layer of said second alloy. Thus, one part of the composite tube is multi-layered, for example double-layered, while the other part is mono-layered. The axial extension of the mono-layered portion and the multi-layered portion may be adjusted depending on application. The outer diameter and the inner diameter of the composite tube may be constant, or essentially constant, along the tube. By "essentially constant" is here to be understood as not varying by more than 10%.

According to one embodiment, the composite tube is formed as a double-layered tube with an annular outer layer of said first alloy and an annular inner layer of said second alloy, both layers extending along an entire axial extension of the composite tube. Alternatively, the composite tube may have an annular inner layer extending along the length of the composite tube and an annular outer layer which comprises several axially adjacent portions of different alloys, or the other way around.

According to one embodiment, the composite tube is formed as a multi-layered tube with an annular outer layer of said first alloy and an annular inner layer of said second alloy, both layers extending along an entire axial extension of the composite tube, wherein said annular outer layer and said annular inner layer are in contact with each other. Further layers may be provided inside of the annular inner layer or outside of the annular outer layer. Depending on for example the alloys used, the layers may be formed in the same hot working process or in subsequent hot working processes.

The disclosure also relates to use of the proposed composite tube within different applications such as, but not limited to, carbon black production, glass production and/or steel and metal processing, an ethylene furnace tube, a reformer tube, a lance tube for pulverized coal injection, a lance tube for a lime kiln, a gas lance tube, a gas port tube, a nozzle tube, a muffle tube, a recuperator tube and a gasifier tube. The proposed composite tubes may also be used in e.g. coupling applications, heat exchanger tubes, burners, etc.

Other advantageous features as well as advantages of the proposed tube and method of manufacturing will appear from the following description.

DEFINITIONS

A composite tube is herein to be understood as a tube having at least one multi-layered portion with annular layers of different alloys, i.e. at least an annular outer layer of a first alloy and an annular inner layer of a second alloy. Such a composite tube is also commonly referred to as a compound tube.

Multi-layered is herein to be understood as having at least two layers.

In the present disclosure, the term "tube" is used. However, the term "pipe" could be used as well.

BRIEF DESCRIPTION OF THE DRAWINGS

Embodiments of the proposed tube and method of manufacturing, not to be interpreted as limiting, will in the following be described with reference to the appended drawings.

FIGS. 5a-c schematically show a base component and an outer component used in an embodiment of the proposed method, with FIG. 5b showing a magnified view of encircled area B in FIG. 5a and FIG. 5c showing a magnified view of encircled area C in FIG. 5a.

DETAILED DESCRIPTION

Figure 1:
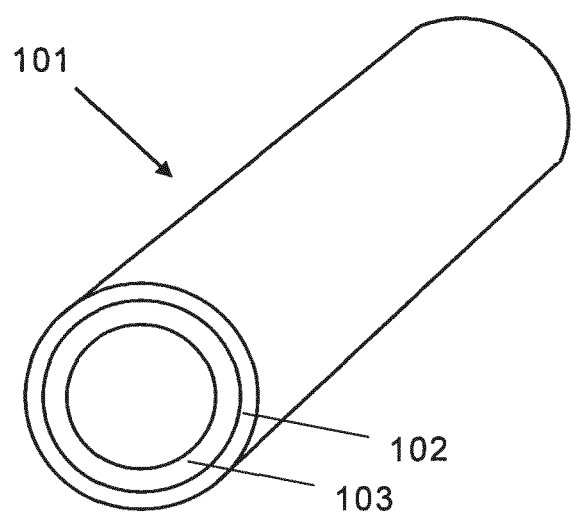
FIG. 1 schematically shows a perspective view of a composite tube according to a first embodiment.
Figure 2:
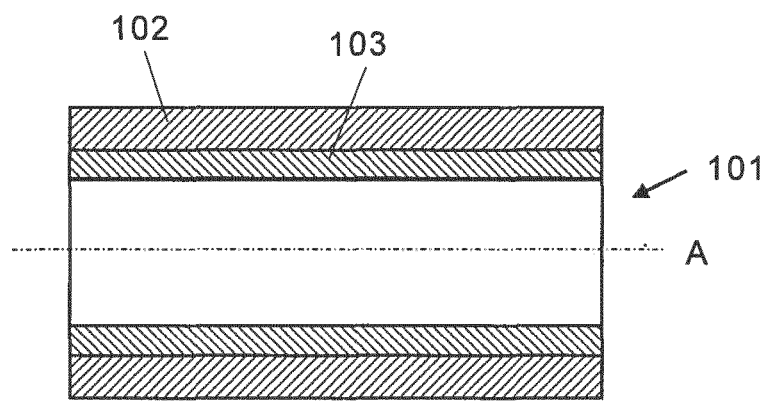
FIG. 2 schematically shows a longitudinal cross section of a composite tube according to the first embodiment.

A composite tube 101 according to a first embodiment is schematically shown in FIG. 1 and FIG. 2. The composite tube 101 extends along a longitudinal axis A and is double-layered with an annular outer layer 102 of a first alloy and an annular inner layer 103 of a second alloy. Both layers 102, 103 extend along an entire axial extension of the composite tube.

Figure 3:
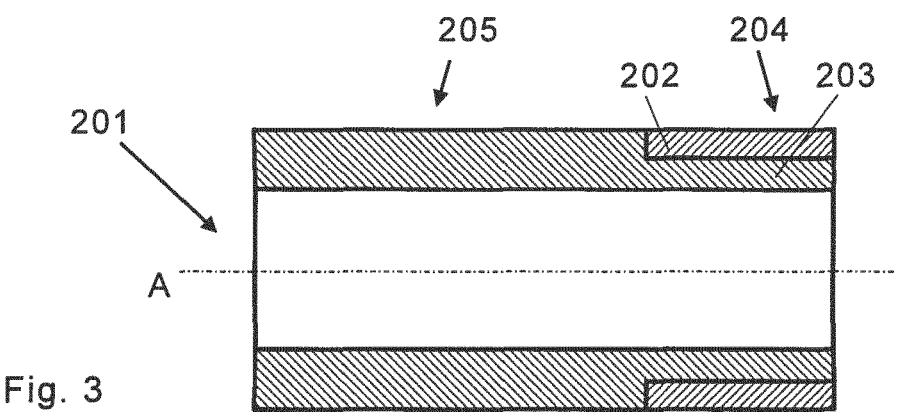
FIG. 3 schematically shows a longitudinal cross section of a composite tube according to a second embodiment.

FIG. 3 shows a composite tube having a double-layered portion 204 and a mono-layered portion 205. The double-layered portion 204 has an annular outer layer 202 of a first alloy and an annular inner layer 203 of a second alloy. The mono-layered portion 205 is entirely formed of the second alloy that the inner layer 203 of the double-layered portion 204 is formed of.

Figure 4:
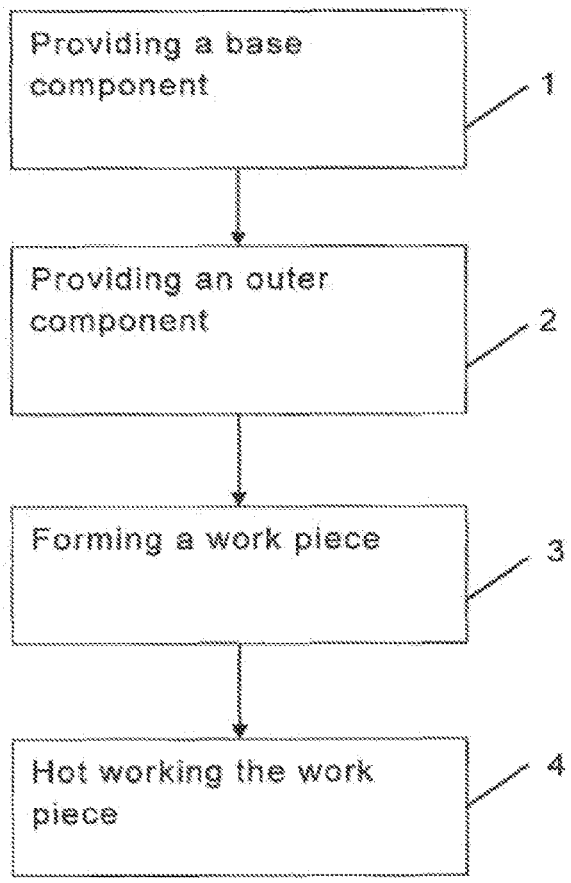
FIG. 4 is a flow chart illustrating an embodiment of the proposed method.
Figure 5D:
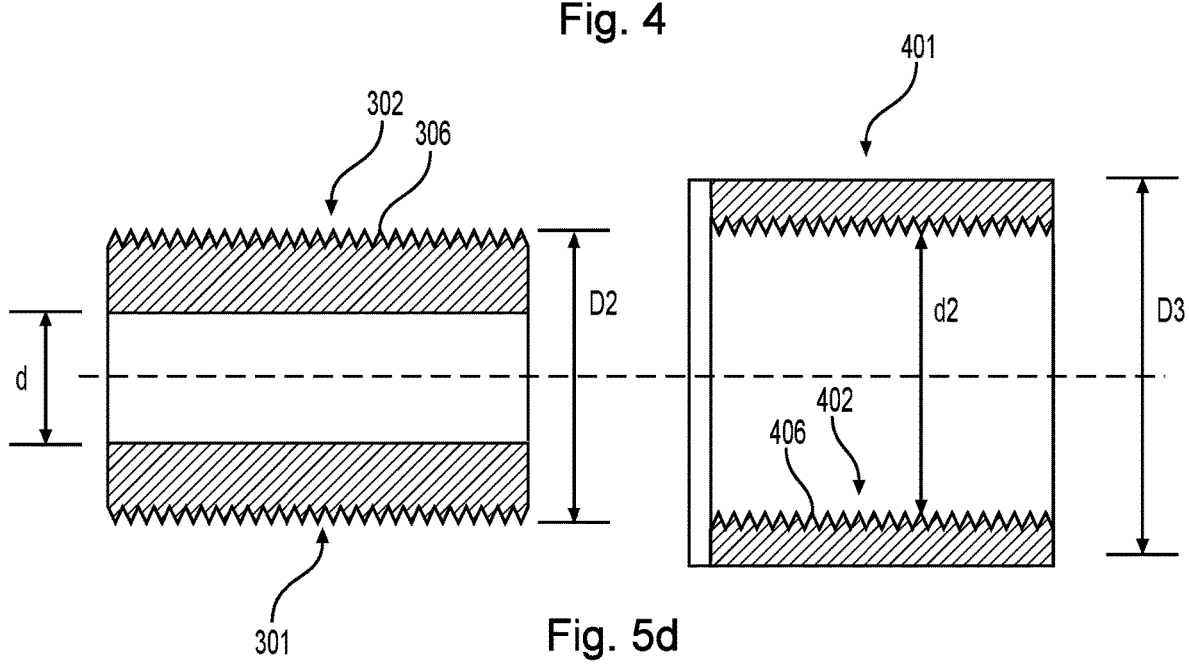
FIG. 5d schematically shows a base component and an outer component used in another embodiment of the proposed method.
Figure 5A:
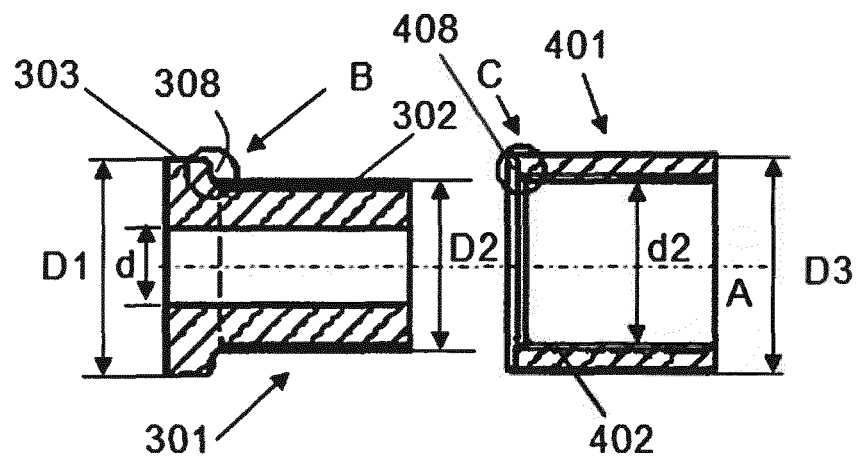
Figure 5B:
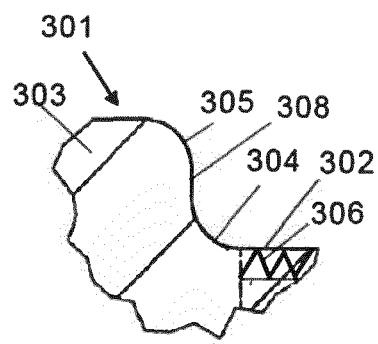
Figure 5C:
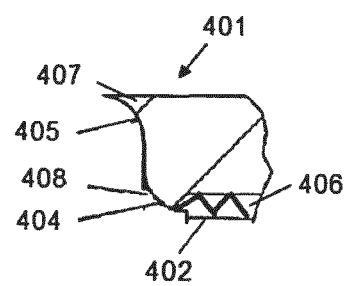
Figure 6:
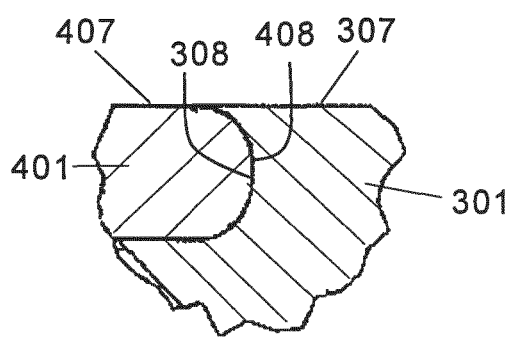
FIG. 6 schematically shows a longitudinal cross section of parts of a base component and an inner component used in an embodiment of the proposed method.

A method for manufacturing a composite tube 101, 201 according to the present disclosure is schematically illustrated in FIG. 4. Reference is also made to FIGS. 5a-c, showing a base component 301 and an outer component 401 used in the process and to FIGS. 6-7.

In a first step 1, the base component 301 of the second alloy, which is to form the inner layer 203 of the composite tube 201 shown in FIG. 3, is provided. The base component 301 is a tube of circular cross section, having a central through-hole extending along a longitudinal axis A. An externally threaded section 302 is provided, having a helical thread 306 (see FIG. 5b) formed in an outer peripheral surface of the base component 301. The threaded section may extend over the entire base component (see FIG. 5d), but in the embodiment shown in FIGS. 5a-c, it corresponds to an end portion of the base component 301. The shown base component 301 thereby has a non-threaded section 303 adjacent the threaded section 302. An inner diameter d of the base component is constant or essentially constant along the longitudinal axis, but an outer diameter D1 of the non-threaded section 303 is larger than an outer diameter D2 of the threaded section 302.

In a second step 2, the outer component 401 of the first alloy is provided. The outer component 401 is also a tube of circular cross section, having a central through-hole extending along the longitudinal axis A. In the shown embodiment, the outer component 401 has a length in the longitudinal direction corresponding to a length of the threaded section 302 of the base component 301. The outer component 401 has an internally threaded section 402, in the shown embodiment extending along the entire length of the outer component 401. In other words, a helical thread 406 (see FIG. 5c) is formed in an inner peripheral surface of the outer component 401. The outer component 401 is thereby configured for threaded engagement with the externally threaded section 302 of the base component 301. An outer diameter D3 of the outer component 401 is equal to or essentially equal to the outer diameter D1 of the non-threaded section 303 of the base component 301, while an inner diameter d2 of the outer component 401 matches the outer diameter D2 of the threaded section 302 of the base component 301.

In a third step 3, a tubular work piece is formed by mounting the outer component 401 around the base component 301 such that the internally threaded section 402 of the outer component 401 is in engagement with the externally threaded section 302 of the base component 301, i.e. by threading the outer component 401 onto the threaded end portion of the base component 301. A mechanical interlock is thereby formed between the threaded sections 302, 402.

In a fourth step 4, the work piece formed in the third step 3 is hot worked, e.g. by means of hot extrusion. During hot working, a metallic bond is formed between the threaded sections 302, 402 while the mechanical interlock is maintained. An outer diameter of the work piece is also reduced and a composite tube 201 is formed. In subsequent steps (not shown), the composite tube 201 may be straightened and/or pickled and/or blasted after hot working. The tube is thereafter cut into its final length.

The components 301, 401 shown in FIG. 5a are adapted for hot extrusion by pushing the work piece through an extrusion die with a leading end first, wherein the leading end is the end at which the outer component 401 is mounted. A transition surface 308 between the externally threaded section 302 of the base component 301 and the non-threaded section 303 is smooth, without sharp edges. The transition surface 308 is shown in more detail in FIG. 5b, showing a magnification of the encircled area B from FIG. 5a. The transition surface is in cross section shaped as an inverted S with a concave portion 304 closest to the threaded section 302, and a convex portion 305 closest to the non-threaded section 303. The outer component 401 has an end surface 408 with a corresponding S-shape with a convex portion 404 close to the internal helical thread 406, and a concave portion 405 close to an outer peripheral surface 407 of the outer component 401 as shown in FIG. 5c, showing a magnification of the encircled area C from FIG. 5a. The concave portion 405 of the end surface 408 will thereby overlap with the convex portion 305 of the transition surface 308, which prevents separation and penetration of oxygen during the extrusion process.

Another option is to let the leading end in the extrusion process be the end on which no outer component is mounted. In this case, shown in FIG. 6, the base component 301 is formed with a C-shaped concave transition surface 308, such that it floats over a rounded annular end surface 408 of the outer component 401 during extrusion and forms a seal. An outer peripheral surface 307 of the base component 301 thus overlaps the outer peripheral surface 407 of the outer component 401 when the components 301, 401 are mounted to form the work piece.

Figure 7:
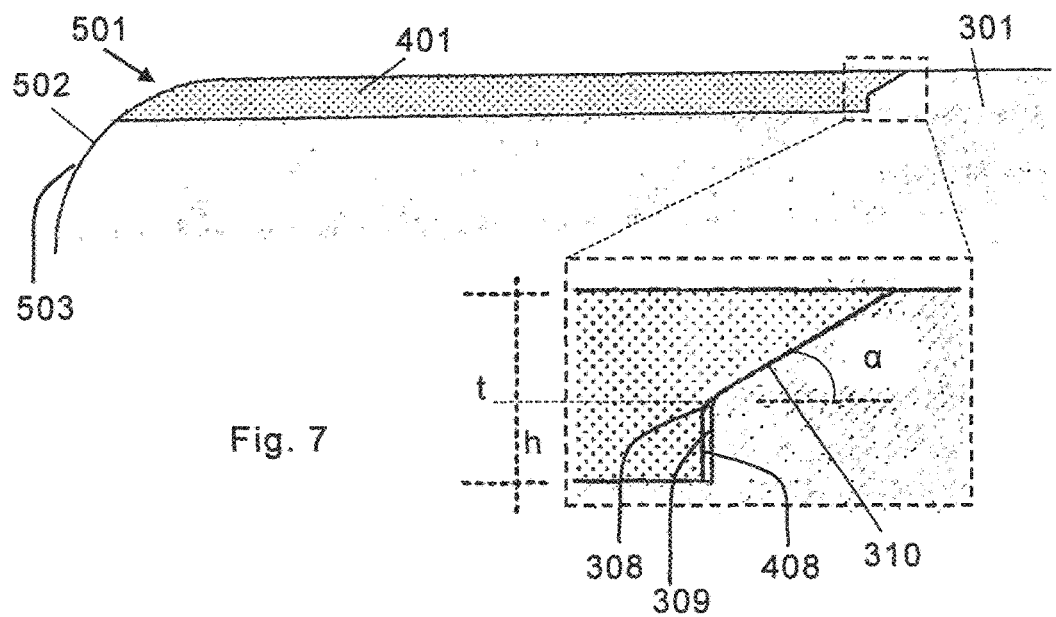
FIG. 7 schematically shows a longitudinal cross section of parts of a work piece used in an embodiment of the proposed method.

FIG. 7 shows a cross sectional view of parts of a work piece 501 adapted for hot extrusion by pushing the work piece 501 through an extrusion die with a leading end 502 first, wherein the leading end 502 is the end at which the outer component 401 is mounted. The ends on which the outer components 401 are mounted have been machined to form rounded end surfaces 503. The design of the transition surfaces 308, 408 of the base component 301 and the outer component 401, respectively, differs in this embodiment somewhat from the design shown in FIGS. 5a-c. The transition surface 308 of the base component 301 includes, as seen in the cross section, a first straight portion 309 perpendicular to the longitudinal axis A, and a second straight portion 310 which is inclined at an angle α of 30° with respect to the longitudinal axis A. A curved surface connects the two straight portions 309, 310. The angle α may of course be varied.

The transition surface 408 of the outer component 401 is formed to engage and overlap with the transition surface 308, such that a seal is formed. Of a total wall thickness t of the outer component, the first straight portion 309 extends over a thickness h.

The present disclosure is further illustrated by the following non-limiting examples:

Example 1

In a first production trial, eight composite tubes according to the embodiment shown in FIG. 3 were manufactured. Eight outer components of a first alloy and eight base components of a second alloy were formed. The first alloy was in this case an austenitic stainless steel alloy according to ASTM 304L. The composition of the first alloy as measured in percent by weight (wt. %) is disclosed in Table I.

TABLE I

| C | Si | Mn | P | S | Cr | Ni | Fe |
|---|---|---|---|---|---|---|---|
| ≤0.030 | 0.5 | 1.3 | ≤0.030 | ≤0.015 | 18.5 | 10 | balance |

The second alloy was a carbon steel according to ASTM Grade A-1 having a composition in wt. % as disclosed in Table II.

TABLE II

| C | Si | Mn | P | S | Fe |
|---|---|---|---|---|---|
| 0.2 | 0.3 | 0.7 | ≤0.035 | ≤0.035 | balance |

Each base component had a total length of 520 mm, an outer diameter of 140 mm, and an inner diameter of 50 mm.

An externally threaded section having a length of 130 mm was formed by cutting machining. The outer components each had a length of 130 mm and an inner diameter of 110 mm and were provided with an internal thread. Of the eight pairs of outer and base components, four pairs had the transitional design shown in FIG. 5a-c and four pairs had the transitional design shown in FIG. 6.

The outer components were washed in an alkaline ultrasonic bath and the base components were degreased using ethanol. The outer components were thereafter threaded onto the base components to form work pieces.

The work pieces were pre-heated at 400° C. for four hours and were thereafter hot extruded using two different extrusion directions. The four work pieces having the design shown in FIG. 5a-c were extruded with the end on which the outer component was mounted as the leading end and the remaining work pieces were extruded with the other end as the leading end. The work pieces were subsequently cooled, straightened and pickled.

Material characterisation using optical microscopy of samples etched in nital and phosphoric acid showed that a metallic bond was formed between the components during hot extrusion for both of the extrusion directions. This was also confirmed using ultrasound. A helically extending thread, forming a mechanical interlock, was clearly detectable in the interface between the inner and outer layers of the composite tubes.

Figure 8A:
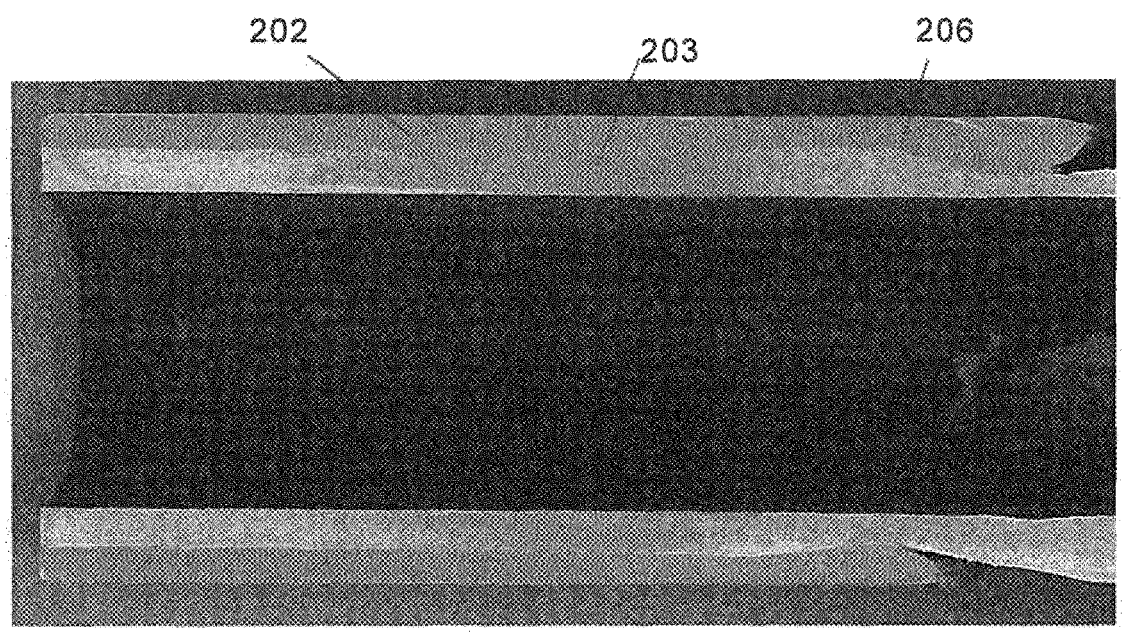
FIG. 8a-b show longitudinal cross sections of a composite tube according to an embodiment.
Figure 8B:
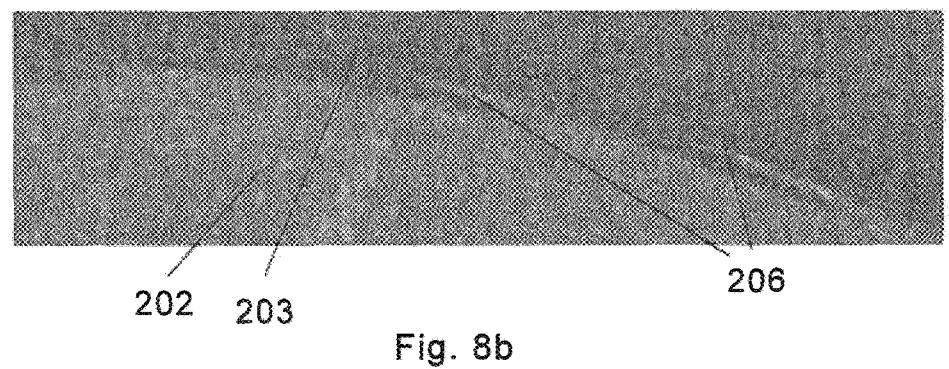

FIG. 8a shows a picture of a longitudinal cross section of the double-layered portion of a composite tube manufactured according to Example 1 and extruded with the end on which the outer component was mounted as the leading end. The composite tube has a double-layered portion with an outer layer 202 and an inner layer 203. In an interface between the layers 202, 203, a helically extending thread 206 can be seen. It is to be noted that the shown composite tube has not yet been cut into its final length by removing the very foremost portion of the extruded tube, which was first pressed through the extrusion die and which consists only of the second alloy forming the inner layer of the double-layered portion. FIG. 8b is a magnification showing the helical thread 206 in closer detail. The picture is taken at a foremost portion of the lance tube, corresponding to the leading end of the work piece.

Example 2

In a second production trial, ten composite tubes according to the embodiment shown in FIG. 3 were manufactured. Ten outer components of a first alloy and ten base components of a second alloy were formed. The first alloy was in this case an iron chromium aluminium (FeCrAl) alloy known under the trademark Kanthal® APM. The composition of the first alloy as measured in percent by weight (wt. %) is disclosed in Table III.

TABLE III

| C | Si | Mn | Al | Cr | Fe |
|---|---|---|---|---|---|
| ≤0.08 | ≤0.07 | 0.7 | 6 | 22 | Balance |

The second alloy was a ferritic stainless steel according to ASTM 446-1 having a composition in wt. % as disclosed in Table IV.

TABLE IV

| C | Si | Mn | P | S | Cr | N | Fe |
|---|---|---|---|---|---|---|---|
| ≤0.20 | 0.5 | 0.8 | ≤0.030 | ≤0.015 | 26.5 | 0.2 | balance |

Each base component had a total length of 400 mm, an outer diameter D1 of 164 mm and an inner diameter d of 41 mm. An externally threaded section having a length of 95 mm and an outer diameter D2 of 154 mm was formed by cutting machining. The outer components each had a length of 95 mm and an inner diameter d2 of 154 mm and were provided with an internal helical thread. The components had the transitional design shown in FIG. 7. A wall thickness t of the outer component was 5 mm and the thickness h was 1.8 mm. The helical thread had a pitch of 2 mm.

The components were degreased using ethanol. The outer components 401 were thereafter threaded onto the base components 301 to form work pieces such as shown FIG. 7.

The work pieces were thereafter heated to 900° C. and hot extruded at temperatures shown in table V. The work pieces were extruded with the end on which the outer component was mounted as the leading end.

TABLE V

| Work piece | Extrusion temp. (° C.) |
|---|---|
| S1 | 1120 |
| S2 | 1120 |
| S3 | 1120 |
| S4 | 1120 |
| S5 | 1120 |
| S6 | 1090 |
| S7 | 1090 |
| S8 | 1070 |
| S9 | 1070 |
| S10 | 1050 |

After hot extrusion, the formed composite tubes were straightened and blasted using steel sand.

Using energy-dispersive X-ray spectroscopy, it was investigated whether a protective aluminium oxide scale had been formed on the outer layer of the double-layered portion during the heat treatment and whether a metallic bond had been formed between the inner and outer layers. It was found that an aluminium oxide scale had been formed on the surface and that aluminium nitride precipitates had formed in the outer layer, indicating nitrogen diffusion from the inner layer of the second alloy ASTM 446-1 into the outer layer of the first alloy Kanthal® APM, which in turn indicates formation of a metallic bond between the layers.

The lengths of the double-layered portions of the manufactured composite tubes were found to be in the range of between 90 cm to 150 cm. A thickness of the outer layer was measured in test samples using optical and electron microscopy and was found to be between 600-900 µm.

The dimensions of the components used in the proposed method may of course be varied, as well as the alloys used and the parameters used during hot working. Various other processing steps may also be included, such as pre-heating and cold pilgering. The design of the base component and the outer component can be varied depending on application and it is also possible to provide two outer components, one on each end portion of a base component or two or more outer components adjacent to each other. Furthermore, more than one base components can be provided at different ends of the outer component or adjacent to one another. Moreover, more than two layers may be provided, for example such that the base component comprises a composite tube having two layers and the annular outer component comprises a mono-layered tube, in which case the final composite tube has three annular layers.

The proposed method and composite tube are not limited to the embodiments described above, but many possibilities to modifications thereof would be apparent to a person with skill in the art without departing from the scope of the appended claims.

The invention claimed is:

1. A method for manufacturing a composite tube having at least one multi-layered portion with an annular outer layer of a first alloy and an annular inner layer of a second alloy, the method comprising the steps of:
   providing an annular base component of the second alloy, wherein the annular base component has a central through-hole extending along a longitudinal axis of the annular base component, and wherein the annular base component has an externally threaded section;
   providing an annular outer component of the first alloy, wherein the annular outer component has an internally threaded section configured to engage with the externally threaded section of the annular base component;
   forming a tubular work piece by mounting the annular outer component around the annular base component such that the internally threaded section of the outer component is in engagement with the externally threaded section of the annular base component, forming a mechanical interlock between the threaded sections; and
   hot working the tubular work piece, so that on one hand a metallic bond is formed between the threaded sections of the annular outer component and the annular base component while the mechanical interlock is maintained, and so that on the other hand the tubular work piece is elongated and an outer diameter of the tubular work piece is reduced, thus forming a composite tube,
   wherein the step of hot working comprises hot extrusion by pushing the tubular work piece through an extrusion die with a leading end first.

2. The method according to claim 1, wherein the externally threaded section has an axial extension corresponding to an axial extension of the internally threaded section.

3. The method according to claim 1, wherein the externally threaded section corresponds to an end portion of the annular base component.

4. The method according to claim 3, wherein the externally threaded section has a smaller outer diameter than an adjacent non-threaded section of the annular base component.

5. The method according to claim 1, wherein the externally threaded section extends along an entire axial length of the annular base component.

6. The method according to claim 1, wherein the leading end is an end portion at which the annular outer component is mounted around the annular base component.

7. The method according to claim 1, wherein the method further comprises machining the leading end prior to hot extrusion, such that a rounded leading end is formed.

8. The method according to claim 1, further comprising straightening the composite tube after hot extrusion.

9. The method according to claim 1, further comprising, after hot extrusion, at least one of pickling the composite tube and blasting the composite tube.

10. The method according to claim 1, further comprising pre-heating the tubular work piece prior to the step of hot working the tubular work piece.

11. The method according to claim 1, wherein the first alloy is selected from a stainless steel alloy, a nickel-based alloy, an iron chromium aluminium alloy, a carbon steel alloy, a zirconium alloy, an aluminium alloy, a copper alloy, or a titanium alloy.

12. The method according to claim 1, wherein the second alloy has a different composition than the first alloy and is selected from a stainless steel alloy, a nickel based alloy, an iron chromium aluminium alloy, a carbon steel alloy, a zirconium alloy, an aluminium alloy, a copper alloy, or a titanium alloy.

13. The method according to claim 1, wherein the composite tube has a mono-layered portion of said second alloy.

14. The method according to claim 1, wherein hot extrusion reduces the outer diameter of the tubular work piece.

15. The method according to claim 1, wherein the outer diameter and an inner diameter of the composite tube are essentially-constant along the composite tube.

16. The method according to claim 1, wherein in a longitudinal cross-section of the composite tube, a portion of a thread of the externally threaded section of the annular base component extends in a longitudinal direction.

17. The method according to claim 1, wherein, in a longitudinal cross-section of the composite tube, a portion of a thread of the externally threaded section of the annular base component overlaps in a radial direction a portion of a thread of the internally threaded section of the annular outer component.

\* \* \* \* \*